US010640020B2

(12) United States Patent
Jung et al.

(10) Patent No.: US 10,640,020 B2
(45) Date of Patent: May 5, 2020

(54) BABY CAR SEAT ALLOWING POSITION CHANGE

(71) Applicant: DONG-IN ENTECH CO., LTD., Gyeonggi-do (KR)

(72) Inventors: In Soo Jung, Gyeonggi-do (KR); Gwon Je Sung, Seoul (KR); Chung Sup Lee, Gyeonggi-do (KR)

(73) Assignee: DONG-IN ENTECH CO., LTD., Gyeonggi-do (KR)

( * ) Notice: Subject to any disclaimer, the term of this patent is extended or adjusted under 35 U.S.C. 154(b) by 0 days.

(21) Appl. No.: 16/093,509

(22) PCT Filed: Apr. 12, 2016

(86) PCT No.: PCT/KR2016/003854
§ 371 (c)(1),
(2) Date: Oct. 12, 2018

(87) PCT Pub. No.: WO2017/179745
PCT Pub. Date: Oct. 19, 2017

(65) Prior Publication Data
US 2019/0135142 A1    May 9, 2019

(51) Int. Cl.
*B60N 2/28* (2006.01)
(52) U.S. Cl.
CPC ........... *B60N 2/2875* (2013.01); *B60N 2/286* (2013.01); *B60N 2/2821* (2013.01); *B60N 2/2869* (2013.01)
(58) Field of Classification Search
None
See application file for complete search history.

(56) References Cited

U.S. PATENT DOCUMENTS

| 4,936,629 | A |   | 6/1990  | Young |              |
|-----------|---|---|---------|-------|--------------|
| 4,971,392 | A |   | 11/1990 | Young |              |
| 5,183,312 | A | * | 2/1993  | Nania | B60N 2/146   |
|           |   |   |         |       | 108/139      |
| 5,746,478 | A | * | 5/1998  | Lumley| B60N 2/2875  |
|           |   |   |         |       | 297/250.1    |
| 6,196,629 | B1|   | 3/2001  | Onishi et al. |      |
| 6,428,099 | B1| * | 8/2002  | Kain  | B60N 2/2806  |
|           |   |   |         |       | 297/250.1    |
| 6,505,887 | B2| * | 1/2003  | Hampton | B60N 2/06  |
|           |   |   |         |       | 297/250.1    |
| 6,679,552 | B1| * | 1/2004  | Kassai | B60N 2/2812 |
|           |   |   |         |       | 297/250.1    |

(Continued)

FOREIGN PATENT DOCUMENTS

| EP | 2 295 287    | 8/2012  |
| JP | 2001-310664  | 11/2001 |

(Continued)

OTHER PUBLICATIONS

Extended Search Report Issued by European Patent Office dated Nov. 18, 2019.

(Continued)

*Primary Examiner* — David E Allred
(74) *Attorney, Agent, or Firm* — IP & T Group LLP

(57) ABSTRACT

The present invention relates to a baby car seat allowing a position change, and the purpose thereof is to provide a baby car seat which allows the posture of a baby to be changed in the direction thereof to a horizontal direction.

13 Claims, 12 Drawing Sheets

(56) References Cited

U.S. PATENT DOCUMENTS

| | | | |
|---|---|---|---|
| 7,073,859 B1 | 7/2006 | Wilson | |
| 7,575,276 B1 * | 8/2009 | Henry | B60N 2/2821 297/256.12 |
| 8,651,572 B2 * | 2/2014 | Medeiros | A47D 1/002 297/256.13 |
| 9,487,111 B2 * | 11/2016 | Lake | B60N 2/2869 |
| 9,758,068 B2 * | 9/2017 | Taylor | B60N 2/2875 |
| 10,449,876 B2 * | 10/2019 | Lonstein | B60N 2/0232 |
| 2004/0070246 A1 * | 4/2004 | Adachi | B60N 2/2806 297/256.12 |
| 2006/0170262 A1 * | 8/2006 | Gold | B60N 2/2869 297/256.12 |
| 2008/0224516 A1 | 9/2008 | Vegt | |
| 2010/0032997 A1 * | 2/2010 | Gold | B60N 2/2821 297/217.1 |
| 2011/0109137 A1 * | 5/2011 | Tamanouchi | B60N 2/2806 297/250.1 |
| 2011/0109138 A1 * | 5/2011 | Inoue | B60N 2/2806 297/256.13 |
| 2013/0307300 A1 * | 11/2013 | Pos | B60N 2/2812 297/216.12 |
| 2015/0336481 A1 * | 11/2015 | Horsfall | B60R 22/10 297/256.12 |
| 2017/0355287 A1 * | 12/2017 | Anderson | B60N 2/2857 |
| 2019/0077282 A1 * | 3/2019 | Reaves | B60N 2/2875 |

FOREIGN PATENT DOCUMENTS

| | | |
|---|---|---|
| JP | 2002-301965 A | 10/2002 |
| JP | 2009-166767 | 7/2009 |
| KR | 200350920 | 5/2004 |
| WO | 2015/025432 | 2/2015 |

OTHER PUBLICATIONS

Office Action issued by Korean Intellectual Property Office dated Jan. 31, 2020.

* cited by examiner

BABY CAR SEAT ALLOWING POSITION CHANGE

This application is a national stage application of PCT/KR2016/003854 filed on Apr. 12, 2016. The disclosure of each of the foregoing applications is incorporated herein by reference in its entirety.

TECHNICAL FIELD

The present invention relates to a baby car seat allowing a position change, and more specifically, to a baby car seat allowing a position change such that a direction of a posture of a baby is changed in a horizontal direction.

BACKGROUND ART

Generally, a baby car seat is essential for the safety of babies. In developed countries such as the United States, by law, it is required for babies under a certain age to be seated on a car seat when operating a vehicle. In the case of Korea, although a car seat is not required by law, recently, the number of vehicles equipped with a car seat in consideration of the safety of babies has significantly increased.

However, when babies are seated on car seats, which have been sold to date, and then the car seats are fastened with a fastening belt, postures of the babies may not be changed. Thus, there are problems in that the baby becomes bored and tired during prolonged driving. Technologies or the like for solving the problems are being developed.

A conventional example of the technologies can be found in the Korean Registered Utility Model No. 20-0350920 entitled "CHILD CAR SEAT FOR VEHICLE."

FIGS. 1 to 3 are views illustrating a conventional child car seat for a vehicle.

Referring to FIGS. 1 to 3, the conventional child car seat for a vehicle includes a main body 1 which includes a seat portion on which a baby is seated, a sliding support plate 1b configured to connect and stably support both sides of a rear portion of the seat portion, and a guide rod 1a protruding from both sides of the sliding support plate 1b; a bottom plate 2 which has a plurality of position adjustment holes 2a formed in side surfaces thereof so as to temporarily fix the sliding support plate 1b at various points, a first main body guide portion configured to guide movement of the sliding support plate 1b, and a second main body guide portion formed on a surface facing the guide rod so as to restrict movement of the guide rod 1a and restrict movement of the main body 1, wherein the guide rod 1a is coupled to pass through the bottom plate 2 so as to support the movement of the main body 1; and a position adjustment plate 3 which is fixed to a center of a bottom surface of the main body 1, is coupled to any one of the position adjustment holes 2a through a position adjustment rod 3d formed at both ends of one side thereof to fix the main body 1 to the bottom plate 2 at a desired position during the movement of the main body 1, and slides on a position adjustment plate guide portion of the bottom plate 2.

The position adjustment plate guide portion is a groove 2b formed in the form of a U-shaped channel in an inner wall of a bottom plate 2. The first main body guide portion is a groove 2c rounded in each of both sides of a bottom surface of the bottom plate 2. The second main body guide portion has a guide hole 2d formed in a sidewall inside the bottom surface and a guide hole 2e formed in a sidewall outside the bottom surface. A stopper support wall 2f is further formed on a rear surface of the bottom plate 2 to restrict the position adjustment plate 3 from being reversed.

In addition, the position adjustment plate 3 includes an operation grip 3a which is a substantially rectangular-shaped panel having a groove formed such that a finger may be put inside a lower surface thereof to vertically move the operation grip 3a and which includes a hinge piece coupling pin 3f formed at a center of a lower surface thereof; an operation grip support plate 3b which has a hexahedron shape with an upper portion opened below the operation grip 3a, which is coupled and fixed to the main body 1 through a main body connection portion 3d, and which slidably supports the operation grip 3a; operation direction conversion hinge pieces 3c which are fixed to both sides of the operation grip support plate 3b and of which one sides are coupled to the operation grip 3a to convert a vertical movement force of the operation grip 3a into a horizontal movement force; a group of position adjustment rods 3d which are coupled to the other sides of the operation direction conversion hinge pieces 3c and slide in a left or right direction so as to correspond to movement of the hinge pieces 3c; and an elastic support spring 3e which is connected to a center between the position adjustment rods 3d and elastically supports each of the position adjustment rods 3d to the outside.

In the conventional child car seat for a vehicle as configured above, the position adjustment rod 3d is inserted into one hole of the position adjustment holes 2a3e. In this case, the main body 1 of the seat may maintain a certain angle according to a state in which the position adjustment rod 3d and the position adjustment hole 2a are coupled.

Here, when the operation grip 3a is pulled so as to change an angle of the main body 1 of the seat, each of the position adjustment rods 3d is moved inward and is separated from the position adjustment hole 2a. Thus, the position adjustment plate 3 is in a state of being transferred along the position adjustment guide groove 2b.

When the position adjustment plate 3 is moved, the main body 1 of the seat coupled to the position adjustment plate 3 is also moved a certain distance. A movement distance of the seat main body 1 is limited by the guide hole 2d inside the bottom plate and the guide hole 2e outside the bottom plate, in which the main body guide rod 1a is moved.

Therefore, a user may move only a limited distance. When the user reaches a desired position, the user releases the operation grip 3a. Then, the elastic spring 3e is operated, and thus, a support bar 3h of the position adjustment rod 3d protrudes outward from the support plate 3b and is coupled to one of the position adjustment holes 2a.

However, in the conventional baby car seat, a direction of a posture of a baby may not be changed in a horizontal direction, and the posture of the baby may be adjusted only in a front direction or a rear direction by adjusting the main body 1 at a certain angle. Thus, various postures may not be provided to the baby in various directions such as a front direction, a rear direction, and a side direction.

In addition, in the conventional baby car seat, since the posture of the baby is adjusted in the front direction or the rear direction by adjusting the main body 1, two hinge points are required. Thus, a structure of the conventional baby car seat is complicated.

DISCLOSURE

Technical Problem

The present invention has been made to solve the above problems of the prior art and is directed to providing a baby car seat allowing a position change, which includes a control unit configured to control a direction of a posture of a baby to be changed in a horizontal direction.

In addition, the present invention is directed to providing a baby car seat allowing a position change, which includes a control unit configured to control an angle of a posture of a baby to be changed in a front direction and a rear direction based on a fixed axis.

Furthermore, the present invention is directed to providing a baby car seat allowing a position change, which includes a control unit interlocked with a control unit configured to control a direction of a posture of a baby to be changed in a horizontal direction and configured to control an angle of the posture to be changed in a front direction and a rear direction based on a fixed axis.

Technical Solution

As a technical idea for achieving the present invention, a baby car seat allowing a position change according to an embodiment of the present invention includes: a base body; a car seat frame installed at an upper side of the base body and mounted with a car seat configured to accommodate a baby; a direction changing unit configured to allow a direction of the car seat frame to be changed relative to the base body in a horizontal direction based on a fixed axis; and an operation unit configured to operate the direction changing unit such that a direction of the direction changing unit is changed.

The direction changing unit may include a rotation block coupled to the base body and rotatable in a horizontal direction and a coupling bolt coupled on the fixed axis through an inside of the rotation block.

The operation unit may include a pressing member configured to fix a position of the direction changing unit after the direction changing unit is rotated and an operation member configured to operate the pressing member such that the direction changing unit is rotatable.

A coupling slot may be radially formed in a head portion of the coupling bolt.

The coupling slot may be formed in a cross shape.

The pressing member may be formed into a round bar shape.

The operation member may be formed of wire.

The baby car seat may further include a roller block configured to facilitate movement of the wire, wherein a roller is coupled to the roller block.

A baby car seat allowing a position change according to another embodiment of the present invention includes: a base body; a car seat frame installed at an upper side of the base body and mounted with a car seat configured to accommodate a baby; a tilting unit configured to allow an angle of the car seat frame to be changed relative to the base body in a front direction and a rear direction based on a fixed axis; and an operation unit configured to operate the tilting member such that an angle of the tilting member is changed.

The tilting unit may have a lower surface formed as a circular arc surface and may include a slide rail having a plurality of latching grooves formed in an upper surface thereof.

The operation unit may include a pressing member configured to fix a position of the tilting unit after the angle of the tilting unit is adjusted and an operation member configured to operate the pressing member such that the angle of the tilting member is adjusted.

The pressing member may be formed into a round bar shape.

The operation member may be formed of wire.

The baby car seat may further include a roller block configured to facilitate movement of the wire, wherein a roller is coupled to the roller block.

A baby car seat allowing a position change according to another embodiment of the present invention includes: a base body; a car seat frame installed at an upper side of the base body and mounted with a car seat configured to accommodate a baby; a direction changing unit configured to allow a direction of the car seat frame to be changed relative to the base body in a horizontal direction based on a fixed axis; a tilting unit configured to allow an angle of the car seat frame to be changed relative to the base body in a front direction and a rear direction based on the fixed axis; and an operation unit configured to operate the direction changing unit and the tilting unit such that the direction of the direction changing unit and the angle of the tilting unit are changed.

The direction changing unit may include a rotation block coupled to the base body and rotatable in a horizontal direction and a coupling bolt coupled on the fixed axis through an inside of the rotation block.

The tilting unit may have a lower surface formed as a circular arc surface and may include a slide rail having a plurality of latching grooves formed in an upper surface thereof.

A coupling slot may be radially formed in a head portion of the coupling bolt.

The coupling slot may be formed in a cross shape.

The operation unit may include a pressing member configured to fix a position of each of the direction changing unit and the tilting unit after the direction of the direction changing unit and the angle of the tilting unit are adjusted and an operation member configured to operate the pressing member such that the direction of the direction changing unit and the angle of the tilting unit are adjusted.

The pressing member may be formed into a round bar shape.

The operation member may be formed of wire.

The baby car seat may further include a roller block configured to facilitate movement of the wire, wherein a roller is coupled to the roller block.

Advantageous Effects

As a technical idea for achieving the present invention, in a baby car seat allowing a position change according to the present invention, a car seat frame mounted with a car seat configured to accommodate a baby is installed at an upper side of a base body, and a direction changing unit is installed between the base body and the car seat frame, thereby changing a direction of a posture of the baby in a horizontal direction.

In a baby car seat allowing a position change according to the present invention, a car seat frame mounted with a car seat configured to accommodate a baby is installed at an upper side of a base body, and a tilting unit is installed between the base body and the car seat frame, thereby changing an angle of a posture of the baby in a front direction and a rear direction based on a fixed axis.

In a baby car seat allowing a position change according to the present invention, a car seat frame mounted with a car seat configured to accommodate a baby is installed at an upper side of a base body, and a direction changing unit and a tilting unit are installed between the base body and the car seat frame, thereby changing a direction of a posture of the baby in a horizontal direction and also changing an angle of the posture in a front direction and a rear direction based on a fixed axis.

MODES OF THE INVENTION

Hereinafter, configurations and operations for embodiments of the present invention will be described in detail with reference to the accompanying drawings. However, the drawings illustrated below and the descriptions that will be described below are exemplary implementation methods among various methods for effectively describing characteristics of the present invention, but the present invention is not limited only to the below drawings and the descriptions. In addition, in the following descriptions of the present invention, detailed descriptions of well-known functions and structures incorporated herein may be omitted to avoid obscuring the subject matter of the present invention. The terms used herein are defined by taking functions of the present invention into account and can be changed according to the custom or intention of users or operators. Therefore, definition of the terms should be made according to the overall disclosures set forth herein.

As a result, the spirit of the present invention is determined by the claims, and the following embodiments are provided only to efficiently describe the spirit of the present invention to those of ordinary skill in the art.

Figure 1:
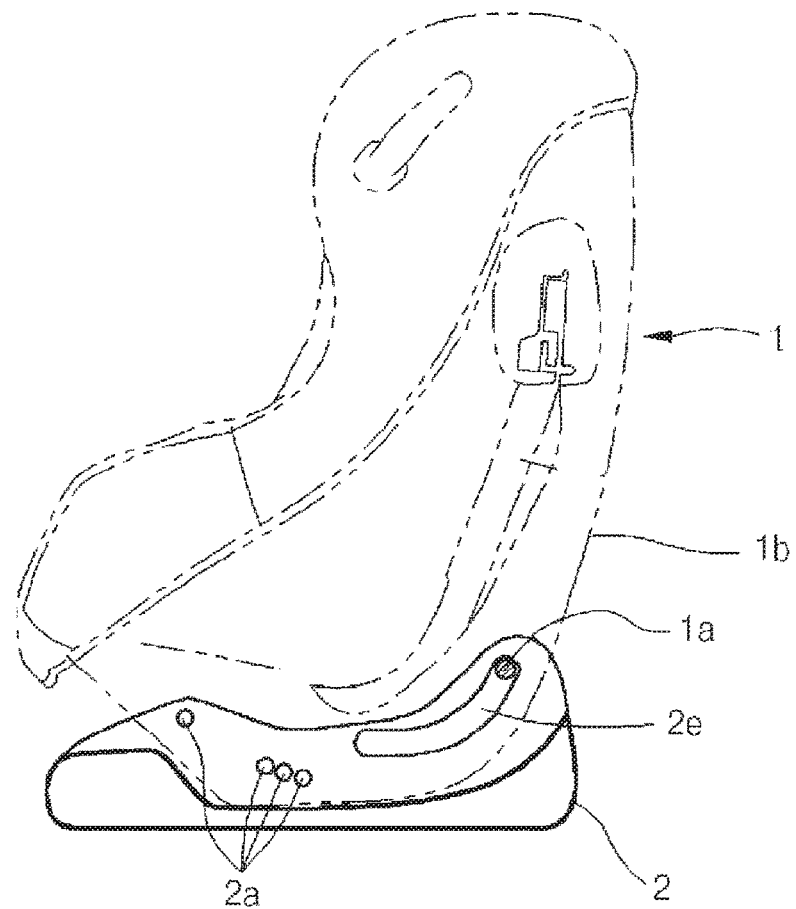
FIGS. 1 to 3 are views illustrating a conventional child car seat for a vehicle.
Figure 2:
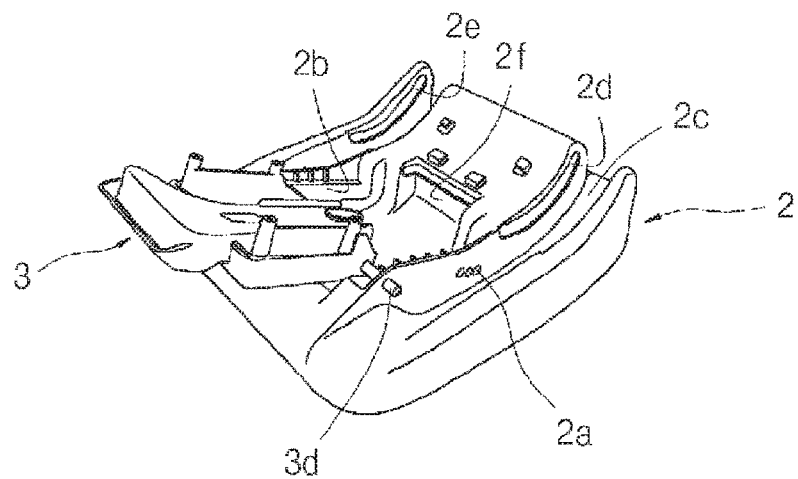
Figure 3:
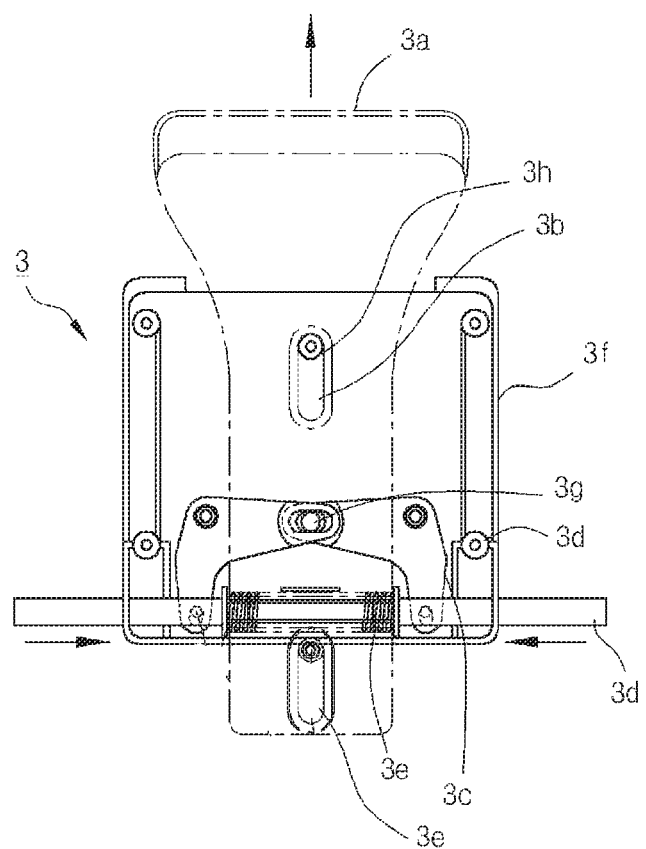
Figure 4:
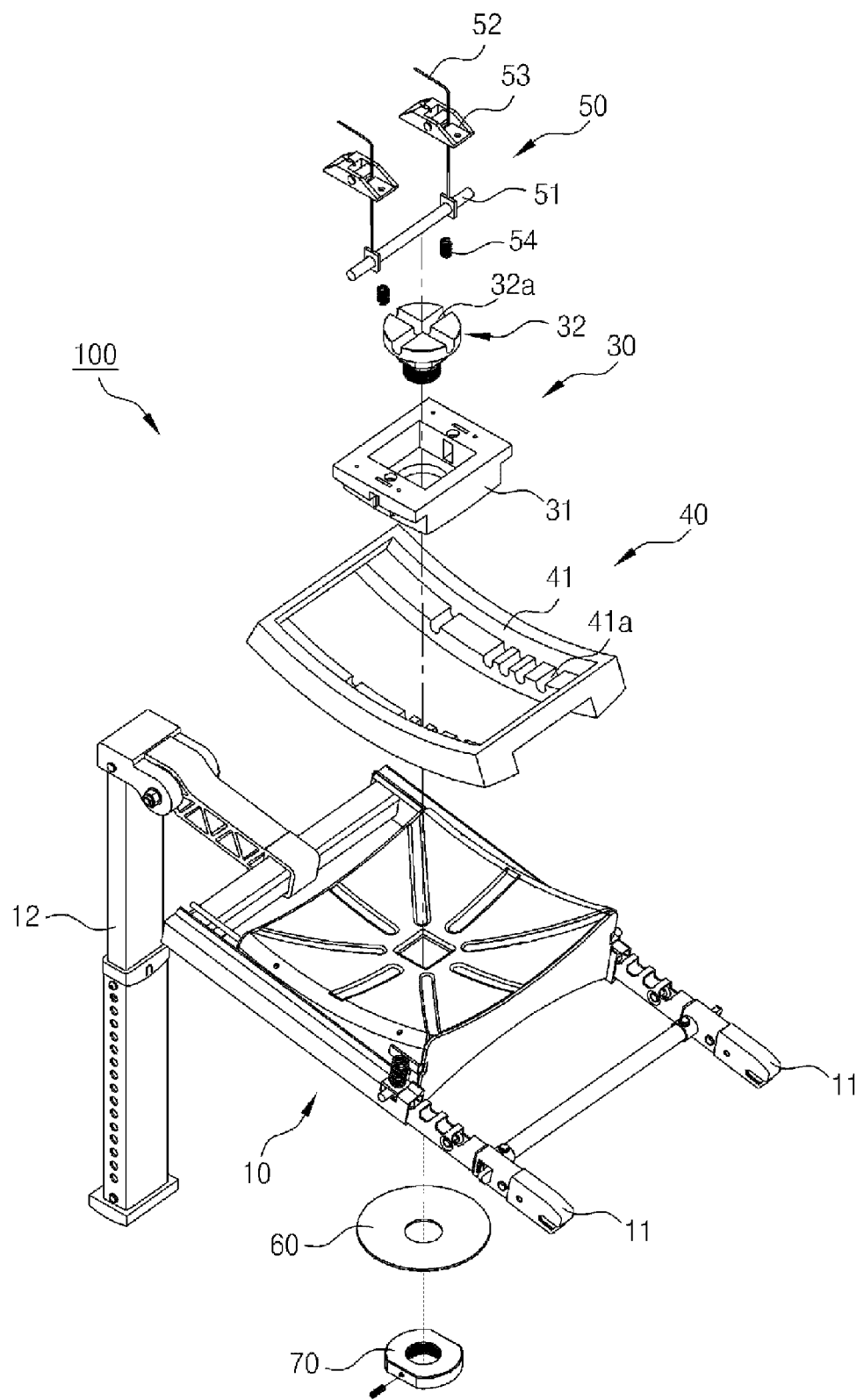
FIG. 4 is an exploded perspective view illustrating a baby car seat allowing a position change according to the present invention.
Figure 5:
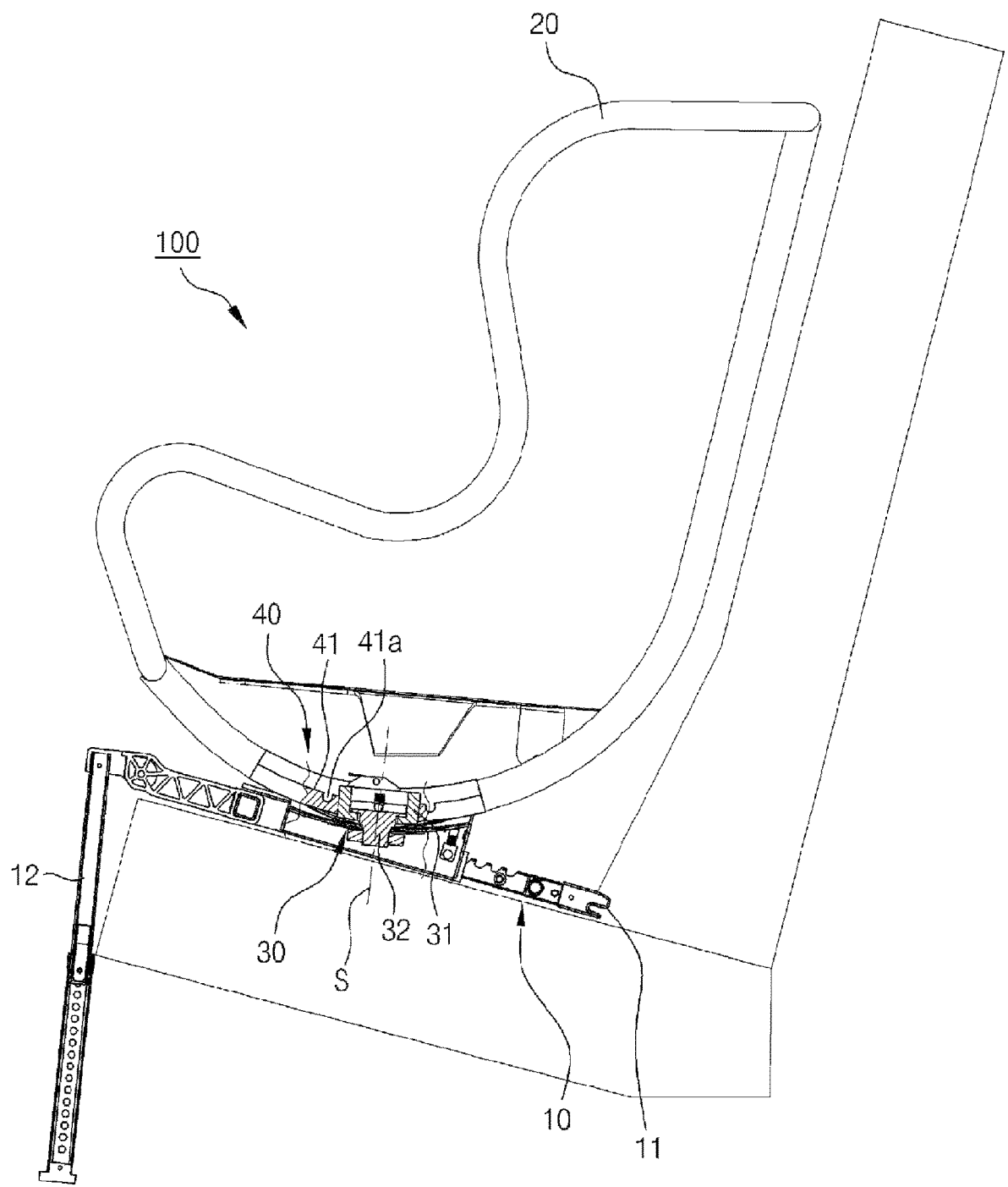
FIG. 5 is a side cross-sectional view illustrating the baby car seat allowing the position change according to the present invention.
Figure 6:
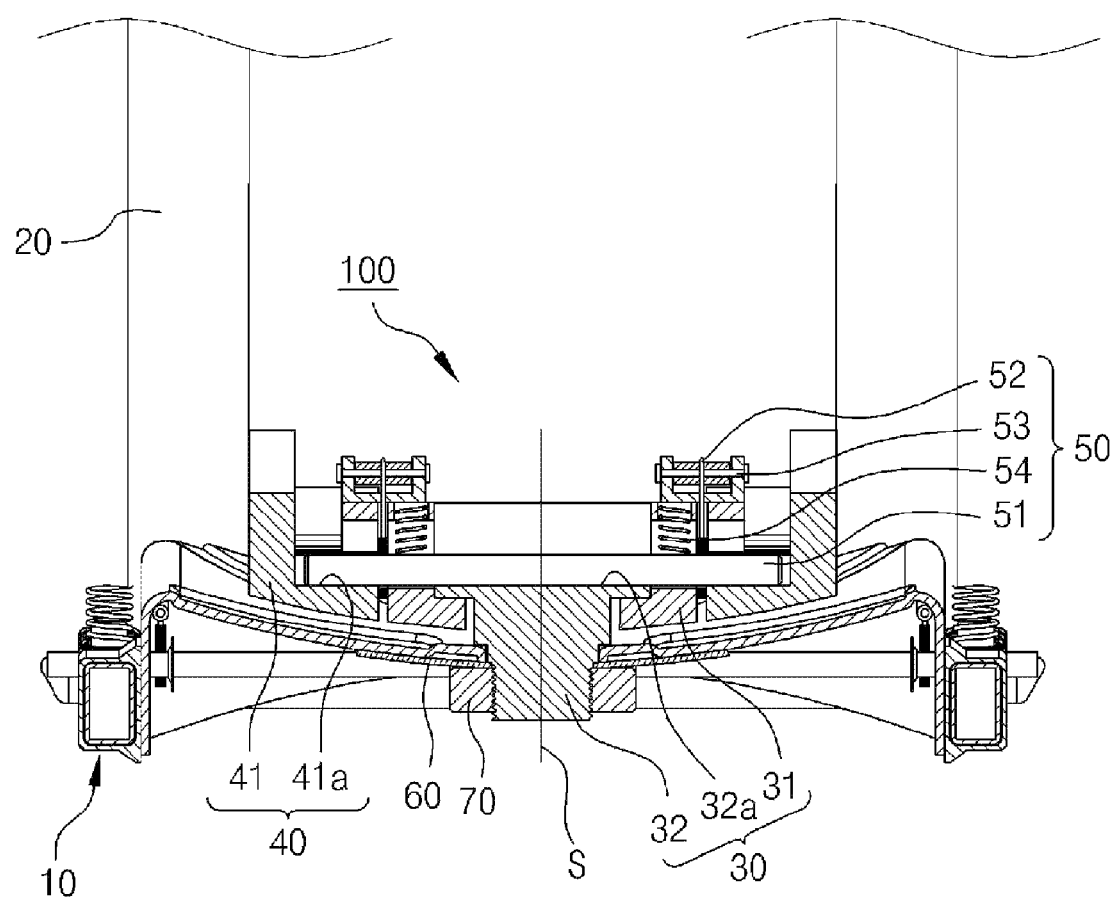
FIG. 6 is a front cross-sectional view illustrating the baby car seat allowing the position change according to the present invention.
Figure 7:
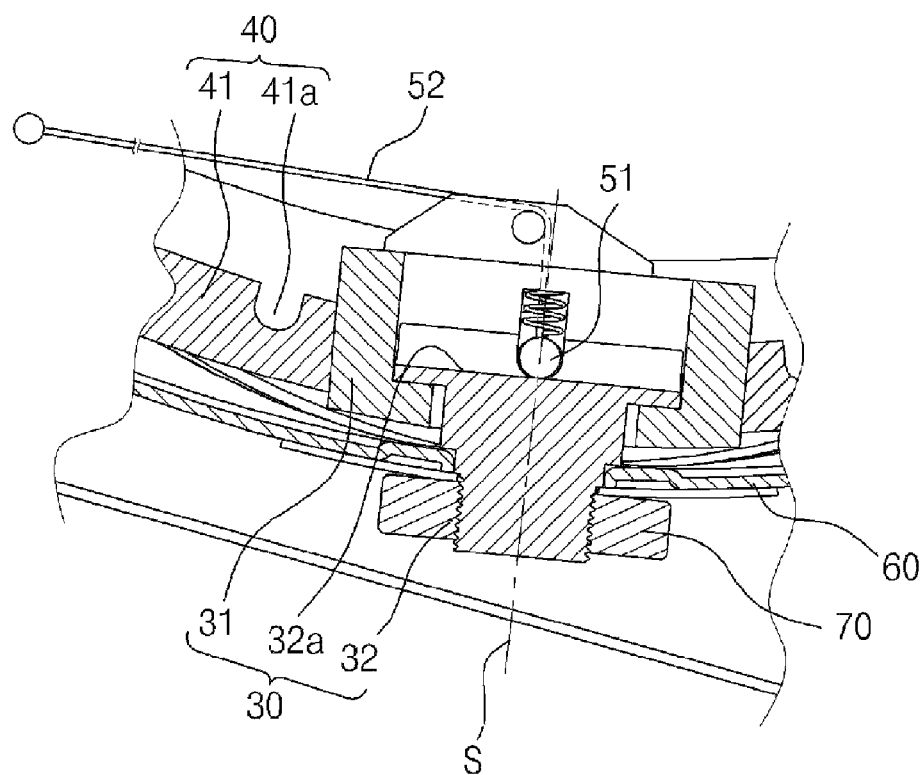
FIG. 7 is a view illustrating a relationship between a direction changing unit and an operation unit of the baby car seat allowing the position change according to the present invention and illustrating a state in which a rotation block is fixed.
Figure 8:
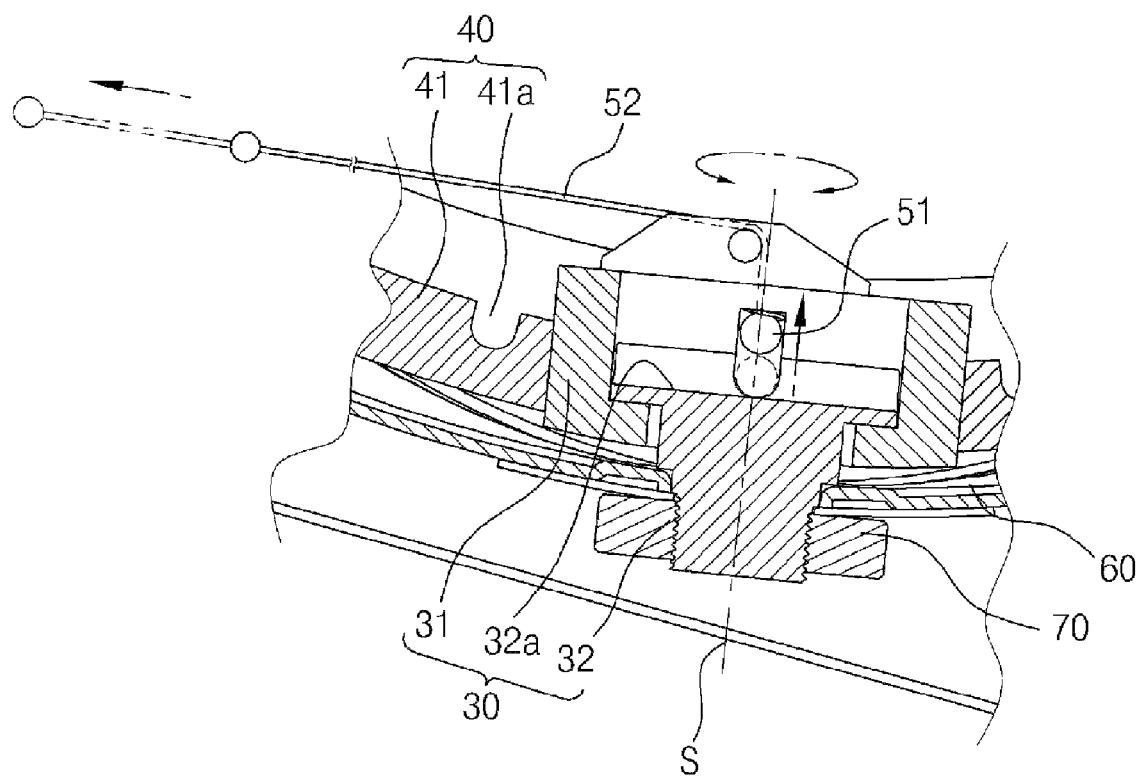
FIG. 8 is a view illustrating a relationship between the direction changing unit and the operation unit of the baby car seat allowing the position change according to the present invention and illustrating a state in which the rotation block is rotatable.
Figure 9:
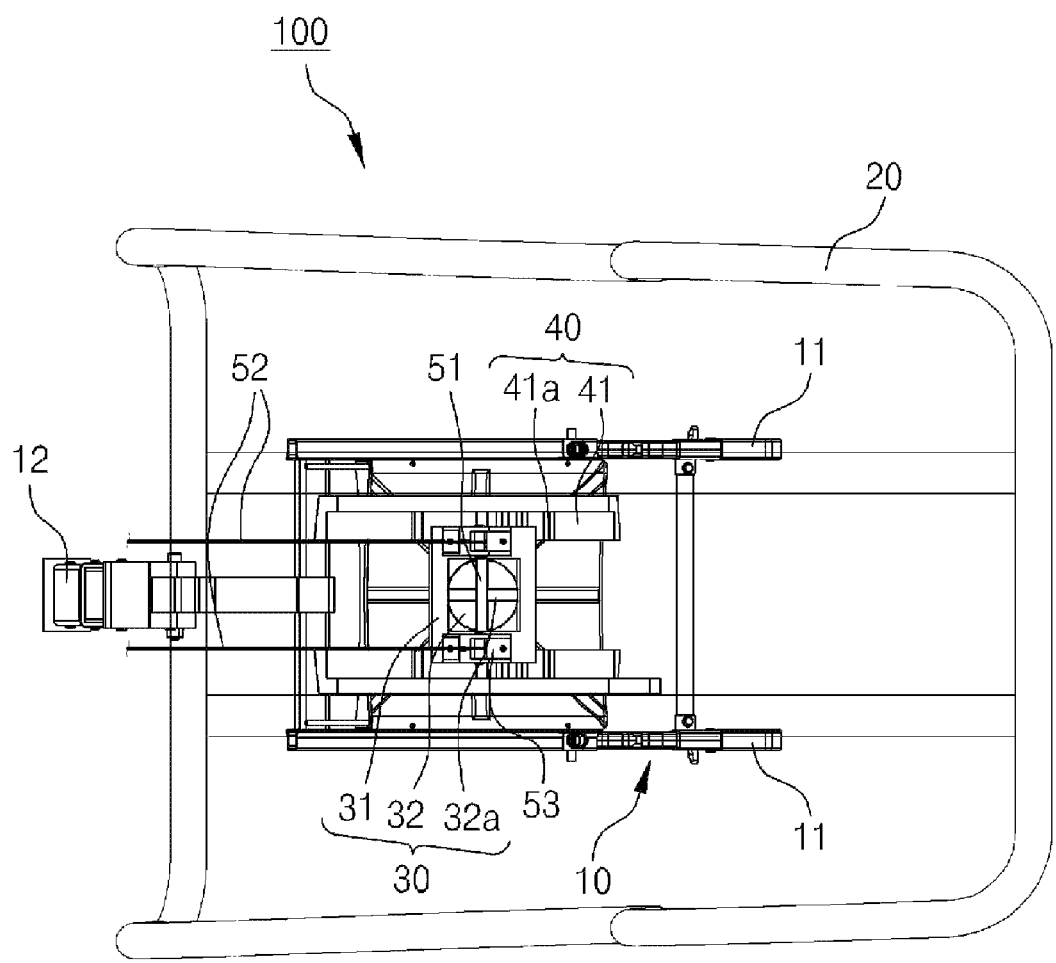
FIG. 9 is a plan view illustrating the baby car seat allowing the position change according to the present invention and illustrating a state in which a car seat frame faces a front direction.
Figure 10:
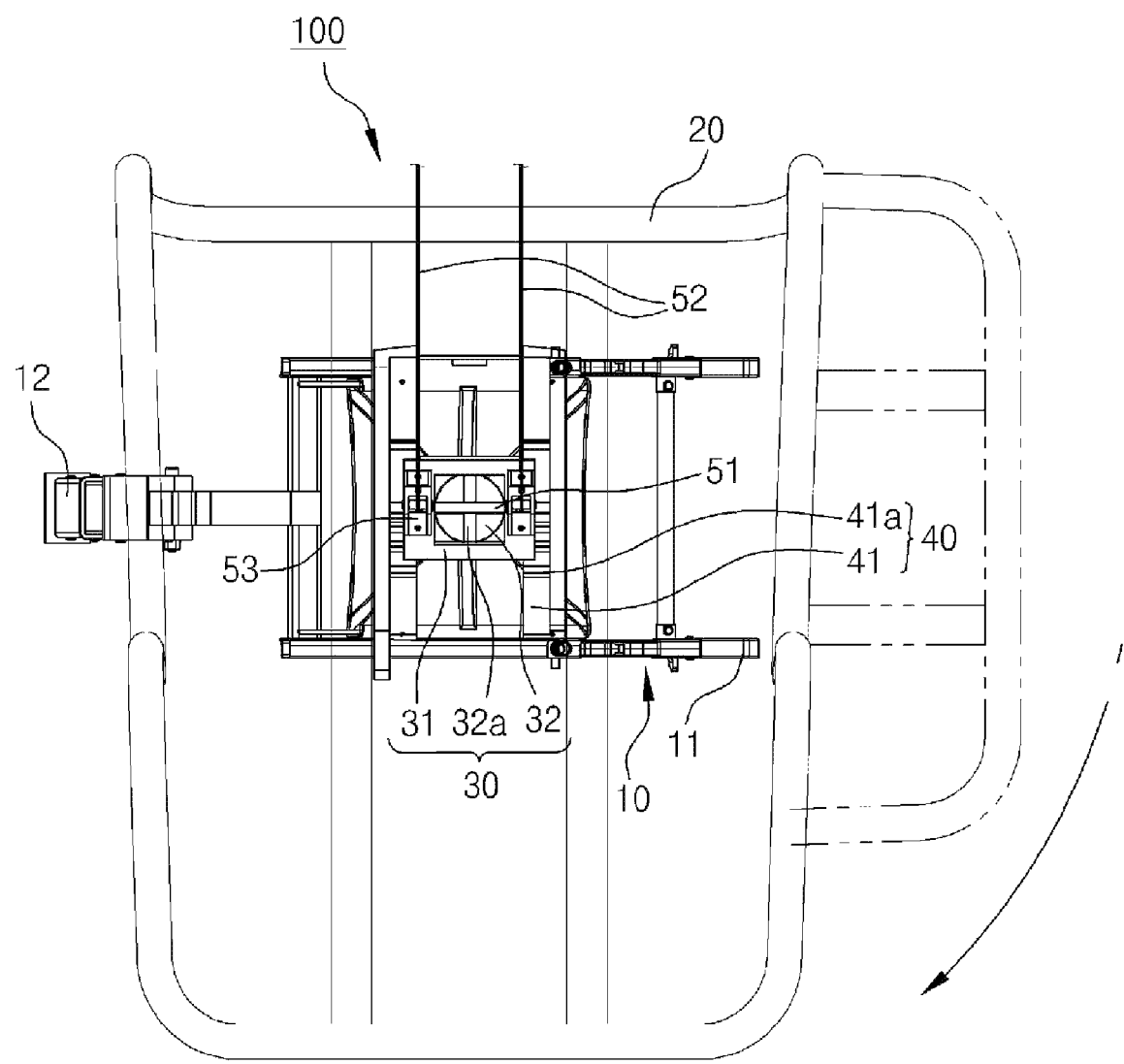
FIG. 10 is a plan view illustrating the baby car seat allowing the position change according to the present invention and illustrating a state in which the car seat frame faces one side direction.
Figure 11:
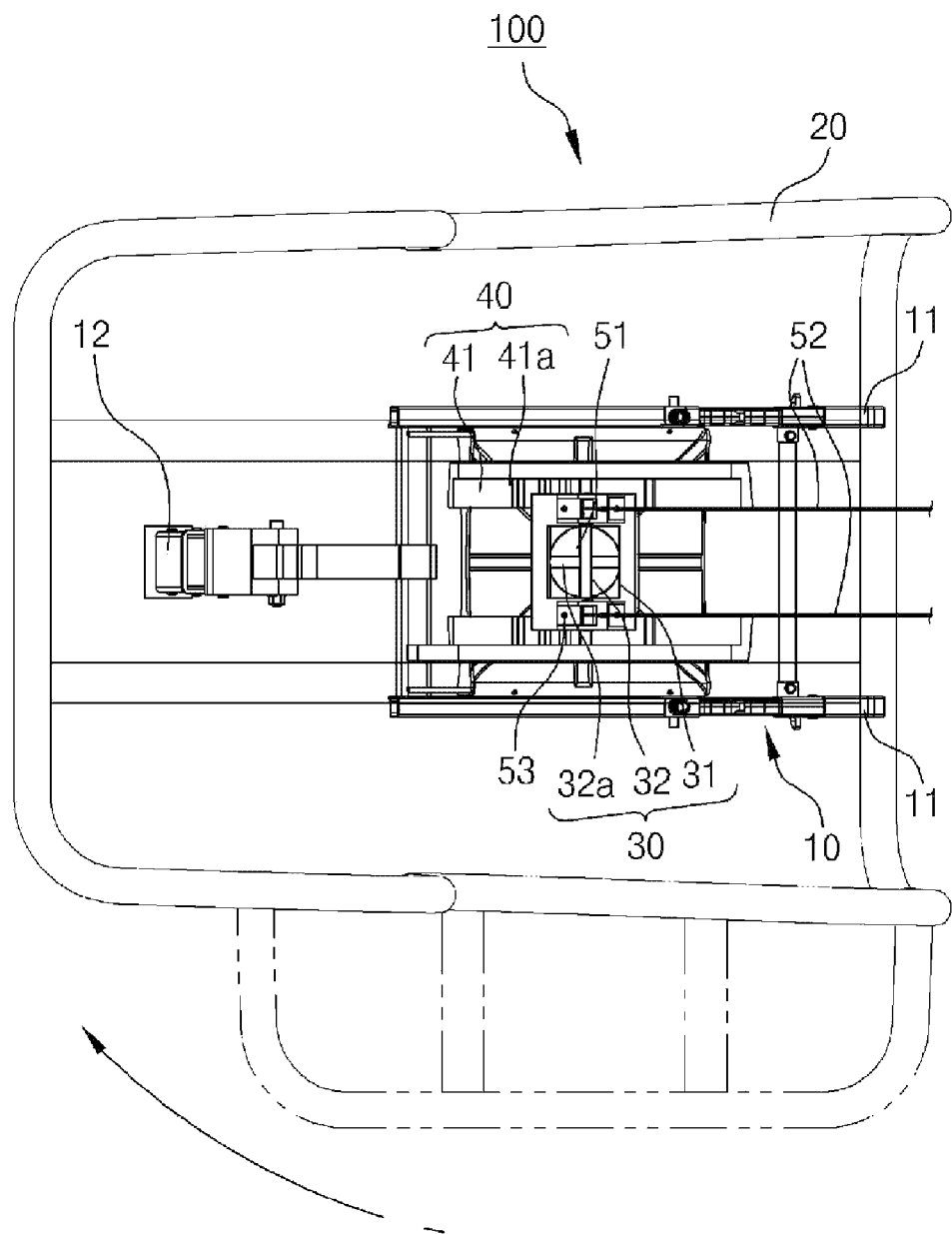
FIG. 11 is a plan view illustrating the baby car seat allowing the position change according to the present invention and illustrating a state in which the car seat frame faces a rear direction.
Figure 12:
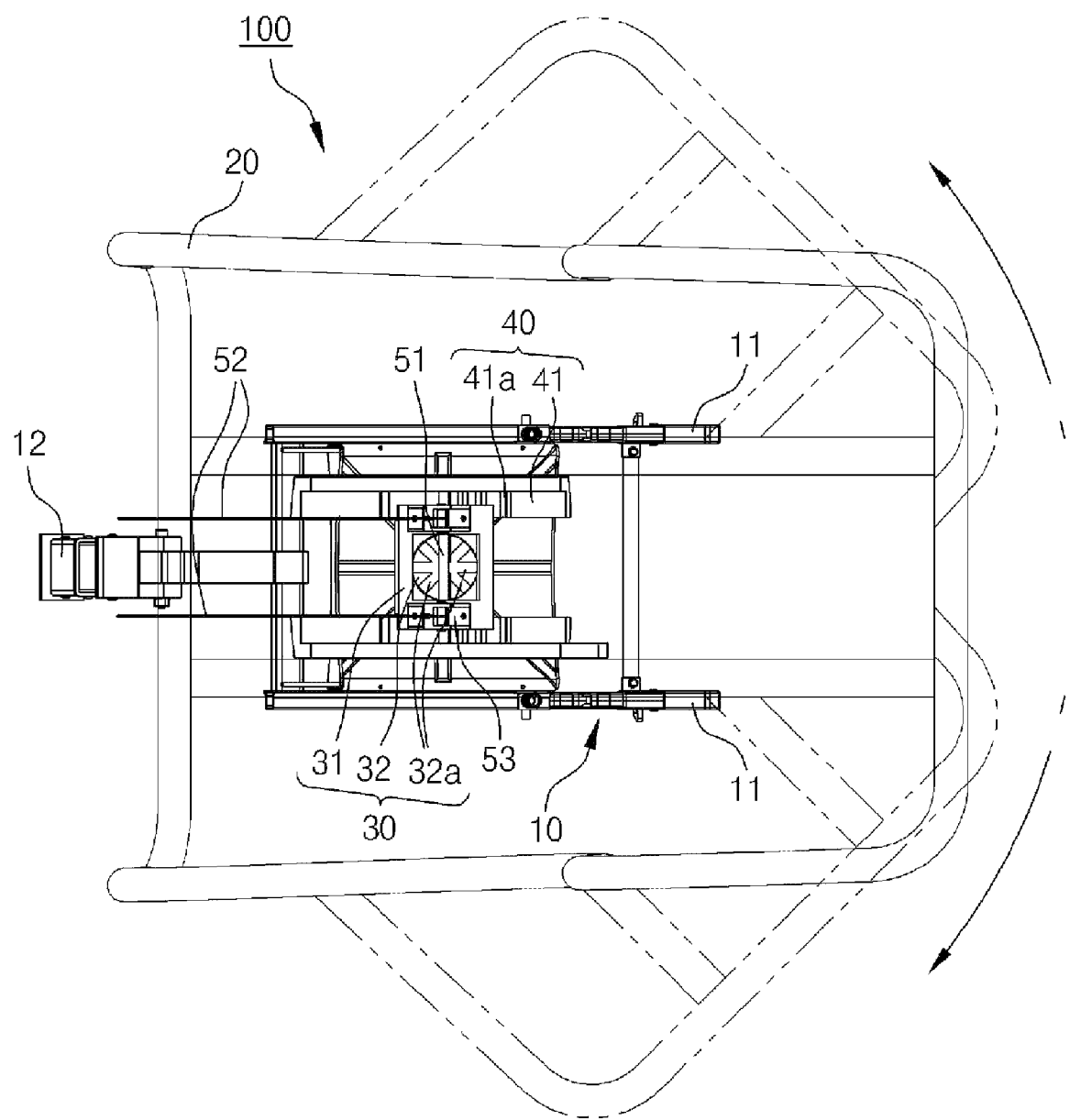
FIG. 12 is a plan view illustrating the baby car seat allowing the position change according to the present invention and illustrating a state in which the car seat frame is rotatable so as to be inclined at a 45° angle.
Figure 13:
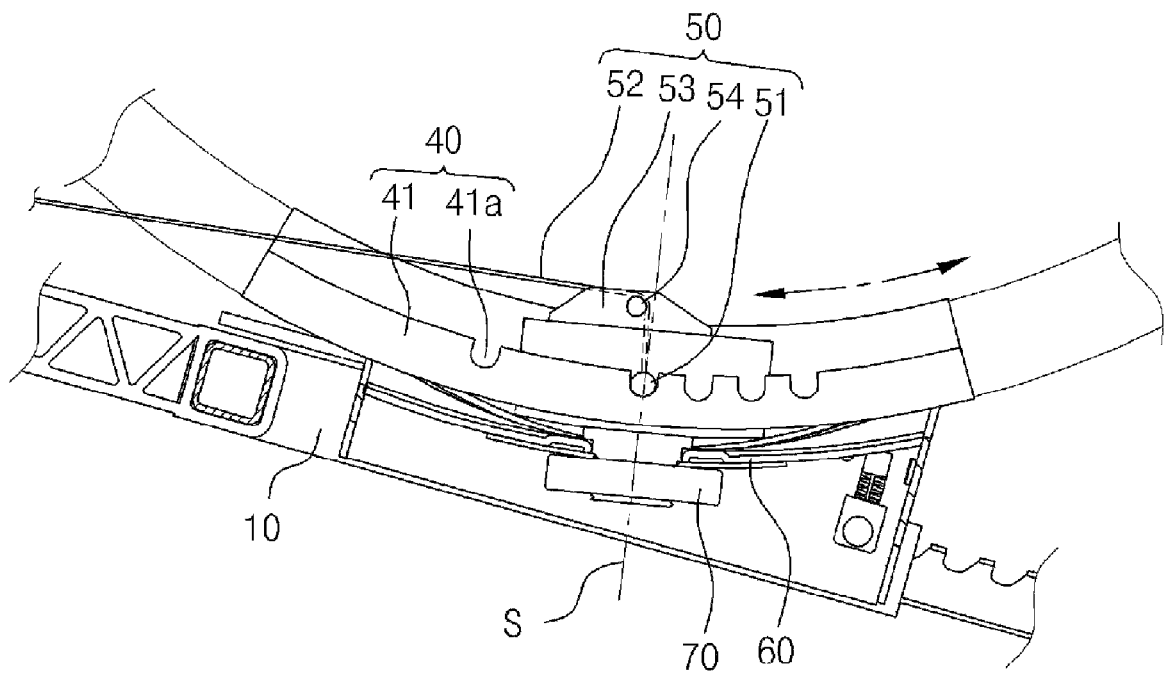
FIG. 13 is a view illustrating a relationship between a tilting unit and the operation unit of the baby car seat allowing the position change according to the present invention and illustrating a state in which a baby is lying down.
Figure 14:
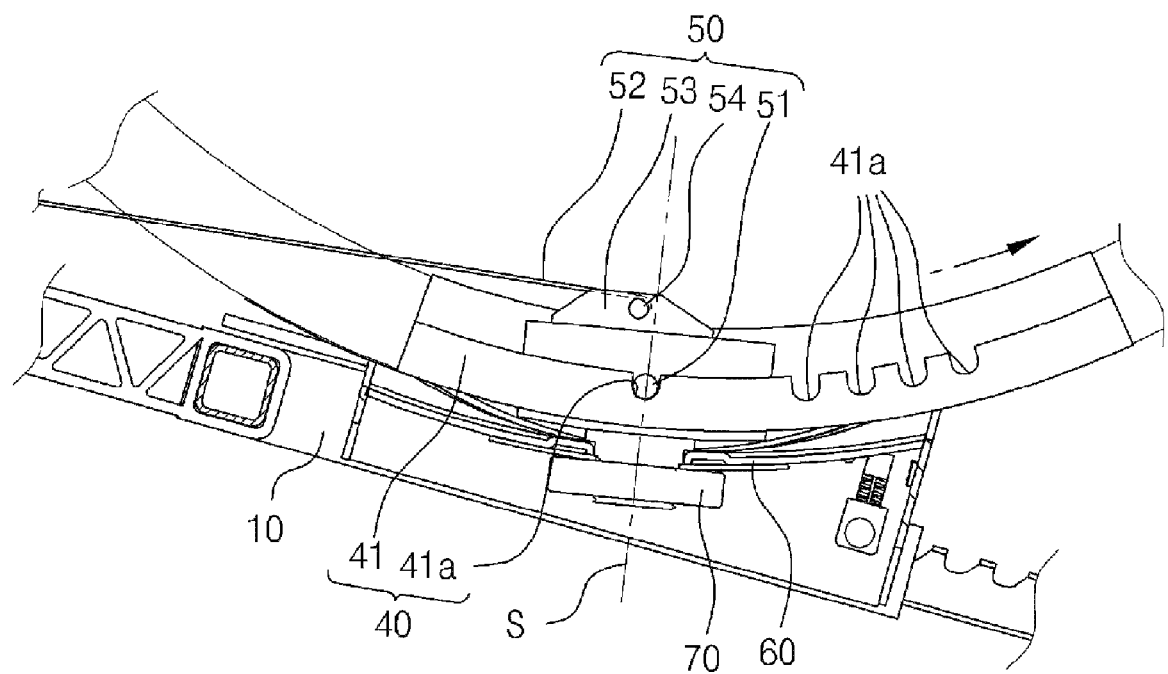
FIG. 14 is a view illustrating a relationship between the tilting unit and the operation unit of the baby car seat allowing the position change according to the present invention and illustrating a state in which a baby is sitting.
Figure 15:
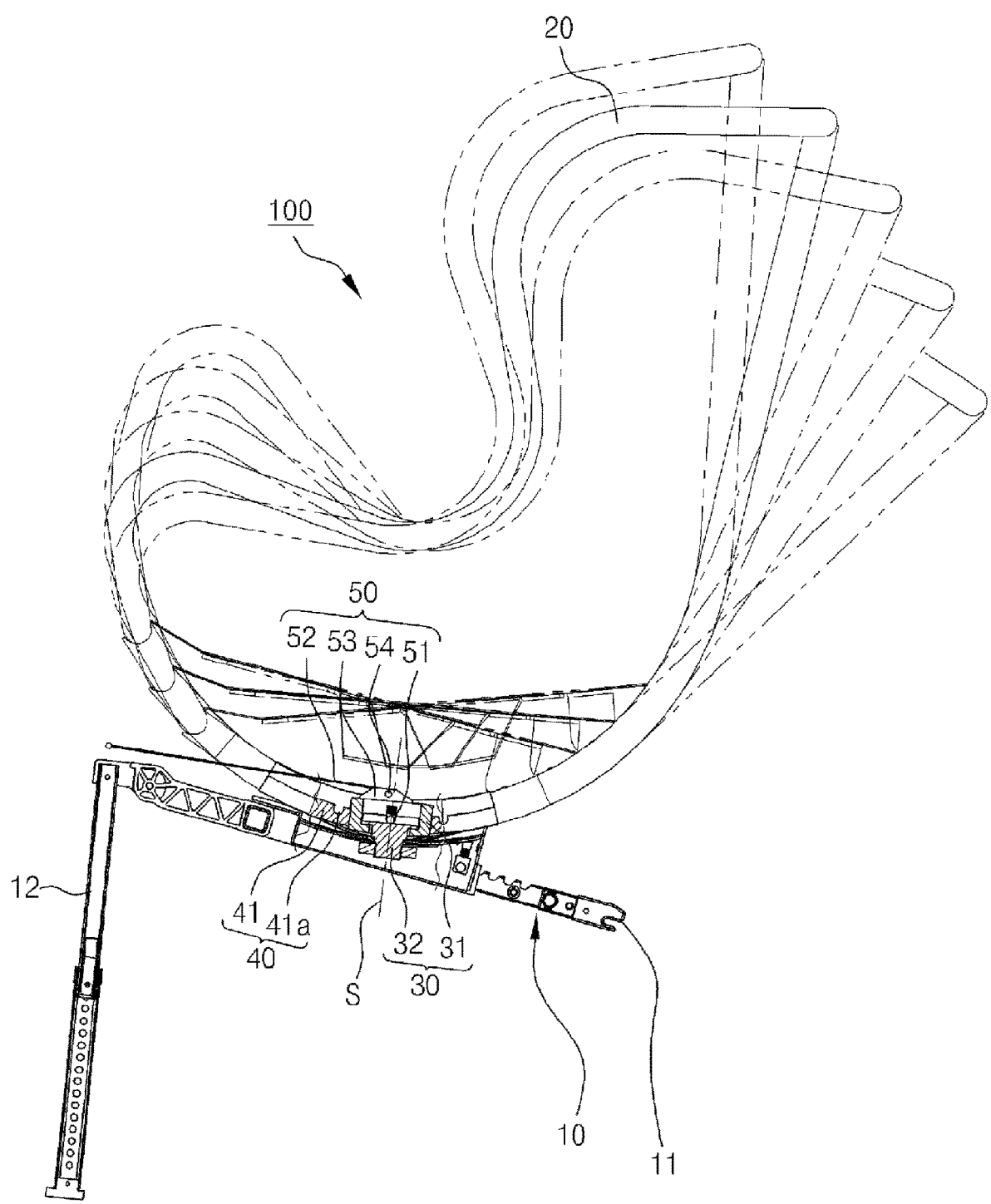
FIG. 15 is a side cross-sectional view illustrating the baby car seat allowing the position change according to the present invention and illustrating a state in which the car seat frame is tilted by the tilting portion.

FIG. 4 is an exploded perspective view illustrating a baby car seat allowing a position change according to the present invention. FIG. 5 is a side cross-sectional view illustrating the baby car seat allowing the position change according to the present invention. FIG. 6 is a front cross-sectional view illustrating the baby car seat allowing the position change according to the present invention. FIG. 7 is a view illustrating a relationship between a direction changing unit and an operation unit of the baby car seat allowing the position change according to the present invention and illustrating a state in which a rotation block is fixed. FIG. 8 is a view illustrating a relationship between the direction changing unit and the operation unit of the baby car seat allowing the position change according to the present invention and illustrating a state in which the rotation block is rotatable. FIG. 9 is a plan view illustrating the baby car seat allowing the position change according to the present invention and illustrating a state in which a car seat frame faces a front direction. FIG. 10 is a plan view illustrating the baby car seat allowing the position change according to the present invention and illustrating a state in which the car seat frame faces one side direction. FIG. 11 is a plan view illustrating the baby car seat allowing the position change according to the present invention and illustrating a state in which the car seat frame faces a rear direction. FIG. 12 is a plan view illustrating the baby car seat allowing the position change according to the present invention and illustrating a state in which the car seat frame is rotatable so as to be inclined at a 45° angle. FIG. 13 is a view illustrating a relationship between a tilting unit and the operation unit of the baby car seat allowing the position change according to the present invention and illustrating a state in which a baby is lying down. FIG. 14 is a view illustrating a relationship between the tilting unit and the operation unit of the baby car seat allowing the position change according to the present invention and illustrating a state in which a baby is sitting. FIG. 15 is a side cross-sectional view illustrating the baby car seat allowing the position change according to the present invention and illustrating a state in which the car seat frame is tilted by the tilting portion.

Referring to FIGS. 4 to 15, a baby car seat 100 allowing a position change according to the present invention includes a base body 10, a car seat frame 20, a direction changing unit 30, a tilting unit 40, and an operation unit 50.

The base body 10 is a portion which is mounted on a seat of a vehicle. The base body 10 may be fixed to a seat belt or an isofix installed in the vehicle.

Here, the isofix is a standard for connection points between a baby protector and a vehicle and follows standards of International Organization for Standardization (ISO).

When the base body 10 of the present invention includes isofix fastening portions 11 formed at one side thereof and fixed to isofixes (not shown) of a vehicle and a leg 12 installed at the other side thereof and thus is mounted on a seat of the vehicle, the base body 10 is supported with respect to a bottom surface of the vehicle.

The car seat frame 20 is installed at an upper side of the base body 10 and is mounted with a car seat (not shown) configured to accommodate a baby.

Various cushioning materials are provided in the car seat so as to wrap the baby in comfort.

In addition, the car seat frame 20 is made of a material such as a metal material, preferably aluminum which has rigidity, through bending and welding.

The direction changing unit 30 allows a direction of the car seat frame 20 to be changed relative to the base body 10 in a horizontal direction based on a fixed axis S. The direction changing unit 30 is a unit which is capable of changing a position of the car seat frame 20 in a left direction, a right direction, a front direction, and a rear direction, and at a certain angle in a state in which a baby is seated on the car seat.

In addition, the direction changing unit 30 includes a rotation block 31 coupled to the base body 10 and rotatable in a horizontal direction and a coupling bolt 32 coupled on the fixed axis S through an inside of the rotation block 31.

Furthermore, a coupling slot 32a may be radially formed in a head portion of the coupling bolt 32, thereby arbitrarily changing a horizontal posture of a baby at an angle of 360°.

In addition, the coupling slot 32a may be formed in a cross shape so that a posture of a baby may be changed at an angle of 90° in a left, right, front, or rear direction.

The tilting unit 40 allows an angle of the car seat frame 20 to be changed relative to the base body 10 in front and rear directions on the fixed axis S. The direction changing unit 30 is a unit which provides a structure capable of seating a baby and also laying the baby at a certain angle.

Furthermore, the tilting unit 40 has a lower surface formed as a circular arc surface and includes slide rails 41 each having a plurality of latching grooves 41a formed on an upper surface thereof.

The operation unit 50 operates the direction changing unit 30 and the tilting unit 40 such that a direction of the direction changing unit 30 and an angle of the tilting unit 40 are changed.

In addition, the operation unit 50 includes a pressing member 51 configured to fix a position of the direction changing unit 30 and the tilting unit 40 after the direction of the direction changing unit 30 and the angle of the tilting unit 40 are adjusted and operation members 52 configured to operate the pressing member 51 such that the direction of the direction changing unit 30 and the angle of the tilting unit 40 are adjusted.

Furthermore, the pressing member 51 may be formed into a round bar shape and may be mounted on the coupling slot 32a of the coupling bolt 32 and the latching groove 41a of the slide rail 41.

In addition, the operation member 52 may be formed of wire to vertically move the pressing member 51. Although not shown in the present invention, a grip may be installed at an end of the operation member 52 to facilitate the operation of the wire.

Further, a roller block 53, to which a roller is coupled, may be further provided to facilitate movement of the operation member 52.

An elastic member 54 is coupled to an upper portion of the pressing member 51 so that when the pressing member 51 is lifted by the operation member 52 and then an external force is removed, the pressing member 51 returns to an original position thereof.

On the other hand, undescribed reference numeral 60 represents a spring washer, and undescribed reference numeral 70 represents a coupling nut to be fixed to the coupling bolt.

The baby car seat 100 allowing the position change of the preset invention as configured above may be fixed to isofixes of a vehicle by using the isofix coupling portions 11 formed in the base body 10 and may variously change a posture of the baby. In an example, the posture of the baby may be changed in a horizontal direction based on the fixed axis S by the direction changing unit 30. In another example, an angle of the car seat frame 20 may be changed in front and rear directions on the fixed axis S by the tilting unit 40. In another example, the direction changing unit 30 and the tilting unit 40 may be concurrently applied.

First, it will be described that the car seat frame 20 is rotated in a horizontal direction by the direction changing unit 30. A posture of the baby may be changed in a 360° direction such as a front direction, a rear direction, a side direction, or a 45° direction at a position where the pressing member 51 is coupled to the coupling slot 32a formed on the head portion of the coupling bolt 32.

That is, when the operation member 52 is pulled, the pressing member 51 is separated from the coupling slot 32a by the operation member 52. When the pressing member 51 is separated from the coupling slot 32a, a user rotates the rotation block 31. Therefore, the car seat frame 20 connected to the rotation block 31 is rotated to change the posture of the baby in a 360° direction such as a front direction, a rear direction, a side direction, or a 45° direction.

As described above, when an external force applied to the operation member 52 is removed in a state in which a position of the rotation block 31 is determined such that the user changes the posture of the baby, while the pressing member 51 returns to an original position thereof by the elastic member 54, the rotation block 31 is not rotated.

Next, it will be described that an angle of the car seat frame 20 is changed in front and rear directions on the fixed axis S by the tilting unit 40. In a state in which the pressing member 51 is coupled to the latching groove 41a of the slide rail 41, the posture of the baby may be changed into a sitting posture or a lying posture.

That is, when the operation member 52 is pulled, the pressing member 51 is separated from the latching groove 41a of the slide rail 41 by the operation member 52. When the pressing member 51 is separated from the latching groove 41a of the slide rail 41, the slide rail 41 is moved to a position desired by the user. When the external force applied to the operation member 52 is removed in a state in which an angle is adjusted, while the pressing member 51 returns to an original position thereof by the elastic member 54, the pressing member 51 is mounted on another latching groove 41a, and thus, a position of the pressing member 51 is fixed.

Since content of another example, in which the direction changing unit 30 and the tilting unit 40 may be concurrently applied, is duplicated with the above-described content, descriptions thereof will be omitted.

Although the present invention has been described with reference to the examples illustrated in the accompanying drawings, those skilled in the art will appreciate that various modifications and other embodiments are possible.

The invention claimed is:

1. A baby car seat allowing a position change, the baby car seat comprising:

a base body;

a car seat frame installed at an upper side of the base body and mounted with a car seat configured to accommodate a baby;

a direction changing unit configured to allow a direction of the car seat frame to be changed relative to the base body;

a tilting unit configured to allow an angle of the car seat frame to be changed relative to the base body; and an operation unit configured to operate the direction changing unit and the tilting unit, wherein the operation unit allows the direction changing unit to adjust the direction of the car seat frame and the tilting unit to adjust the angle of the car seat frame through operations, or fixes the direction and the angle of the car seat frame.

2. The baby car seat of claim 1, wherein the operation unit allows the direction changing unit and the tilting unit to adjust the direction and the angle, respectively, at the same time.

3. The baby car seat of claim 1, wherein the direction changing unit includes a coupling slot in a plurality of directions, the tilting unit includes a plurality of latching grooves in a forward and backward direction, and the operation unit comprises:

a pressing member mounted on the coupling slot and the latching grooves; and an operation member allowing the direction changing unit to change the direction and the tilting unit to change the angle by separating the pressing member from the coupling slot and the latching grooves.

4. The baby car seat of claim 3, wherein the operation unit further comprises an elastic member returning the pressing member to an original position where the pressing member is mounted on the coupling slot and the latching grooves.

5. The baby car seat of claim 3, wherein the pressing member is formed into a round bar shape.

6. The baby car seat of claim 3, wherein the operation member is formed of wire.

7. The baby car seat of claim 6, wherein the operation unit further comprises a roller block configured to facilitate movement of the wire, wherein a roller is coupled to the roller block.

8. The baby car seat of claim 3, wherein the direction changing unit includes:

a rotation block allowing the direction to be adjusted relative to the base body, the rotation block to which the pressing member is movably coupled; and a head portion coupled to the rotation block, the head portion in which the coupling slot is formed, wherein the pressing member is coupled to the rotation block to allow movement of the pressing member between a position mounted on the coupling slot or a position separated from the coupling slot.

9. The baby car seat of claim 8, wherein the pressing member is mounted on the coupling slot to restrict rotation of the rotation block around the head portion, and the operation member allows the rotation of the rotation block around the head portion by separating the pressing member from the coupling slot.

10. The baby car seat of claim 9, wherein the pressing member is separated from the coupling slot in one direction by the operation member and then mounted on the coupling slot in another direction after the rotation block is rotated to restrict the rotation of the rotation block, so that the direction of the car seat frame is changed.

11. The baby car seat of claim 3, wherein the tilting unit includes a slide rail allowing the angle to be adjusted relative to the base body and having the latching grooves formed therein, and the slide rail has a lower surface facing the base body and formed as a circular arc surface and slides back and forth relative to the base body to adjust the angle.

12. The baby car seat of claim 11, wherein the pressing member is mounted on the latching grooves to restrict sliding of the slide rail, and the operation member allows the sliding of the slide rail by separating the pressing member from the latching grooves.

13. The baby car seat of claim 12, wherein the pressing member is separated from one of the latching grooves by the operation member and then mounted on another latching groove after the slide rail slides to restrict the sliding of the slide rail, so that the angle of the car seat frame is changed.

* * * * *